(12) United States Patent
Kitamura

(10) Patent No.: US 6,930,589 B2
(45) Date of Patent: Aug. 16, 2005

(54) METHOD AND SYSTEM FOR TRACKING ITEMS USING A DISTRIBUTED INFRASTRUCTURE

(75) Inventor: Yuji Kitamura, River Edge, NJ (US)

(73) Assignee: SANYO Semiconductor Corporation, Allendale, NJ (US)

( * ) Notice: Subject to any disclaimer, the term of this patent is extended or adjusted under 35 U.S.C. 154(b) by 467 days.

(21) Appl. No.: 09/775,101

(22) Filed: Feb. 1, 2001

(65) Prior Publication Data

US 2002/0101331 A1 Aug. 1, 2002

(51) Int. Cl.[7] ................................................ H04Q 5/22
(52) U.S. Cl. ......................... 340/10.3; 235/375; 701/1
(58) Field of Search ............................... 235/375, 383, 235/385, 378, 384; 455/456.1, 2, 457; 342/357.1; 705/22, 16; 340/11.3, 5.5, 5.7, 905, 933, 937, 942, 10.1, 10.42, 10.5, 932.2, 5.8, 5.9, 572.4, 5.2, 572.1; 701/1, 200, 207

(56) References Cited

U.S. PATENT DOCUMENTS

| | | | | |
|---|---|---|---|---|
| 5,682,142 A | * | 10/1997 | Loosmore et al. | 340/572.1 |
| 5,708,423 A | * | 1/1998 | Ghaffari et al. | 340/5.8 |
| 5,712,789 A | | 1/1998 | Radican | |
| 6,340,935 B1 | * | 1/2002 | Hall | 340/932.2 |
| RE37,822 E | * | 8/2002 | Anthonyson | 701/1 |
| 6,442,530 B1 | * | 8/2002 | Miller | 705/16 |
| 6,570,487 B1 | * | 5/2003 | Steeves | 340/5.2 |
| 6,771,970 B1 | * | 8/2004 | Dan | 455/456.1 |
| 6,789,729 B1 | * | 9/2004 | Solan et al. | 235/375 |

* cited by examiner

Primary Examiner—Michael Horabik
Assistant Examiner—William L Bangachon
(74) Attorney, Agent, or Firm—Katten Muchin Rosenman LLP

(57) ABSTRACT

A plurality of items is tracked using a distributed network of gates, each having a gate-identification. Each item is provided with an identifier for specifying an item-identification of the item and a tracking-station-identification of a tracking station related to the item. Whenever one of the items approaches one of the gates, the item-identification of that item and the tracking-station-identification of the tracking station related to the item are obtained from the identifier of the item via that gate. The item-identification of the item and the gate-identification of the gate are then communicated to the tracking station identified by the tracking-station-identification obtained from the identifier of the item such that the item can be tracked as it moves amongst the gates.

45 Claims, 2 Drawing Sheets

METHOD AND SYSTEM FOR TRACKING ITEMS USING A DISTRIBUTED INFRASTRUCTURE

FIELD OF THE INVENTION

The present invention relates generally to methods and systems for tracking one or more items and, more particularly, to methods and systems for tracking an item by detecting an item-identification associated with the item using a distributed detection infrastructure.

BACKGROUND

Various systems have been developed and implemented for tracking such diverse items as parcels, credit cards, personal belongings, library materials, livestock, automobiles, and even people. For example, many toll roads employ a toll-collection system in which a wireless device is installed in an automobile. The wireless device stores either a remaining balance of pre-paid toll money in an account of the owner of the automobile or simply the account number of the automobile owner's pre-paid toll account. Whenever the automobile is driven past an automated toll-collection booth on a toll-road employing such a system, this toll-collection system automatically deducts the amount of toll charged at that automated toll-collection booth either from the remaining balance stored in the wireless device in the automobile or from a remotely stored ledger-balance maintained for the account identified by the account number stored in the wireless device. In either case, the account associated with the automobile is automatically updated as the automobile passes the toll-collection booth. Thus, this system simply maintains a current balance for the pre-paid toll account of each automobile owner having a wireless device for the system. The system does not maintain a record of the location of each toll collection for the automobile and thus does not permit automobiles to be tracked.

Another example of a prior system for tracking items (in particular, parcels) is the parcel-tracking system of Federal Express®. Each parcel delivered by Federal Express® is labeled with a parcel number. Federal Express® maintains a database of the parcel numbers for parcels shipped by Federal Express®, together with status and/or delivery information relating to that parcel. When a parcel is deposited with Federal Express®, an entry is added to the Federal Express® tracking database containing at least the parcel number of that parcel and an indication that the parcel has not yet been delivered. When the parcel is eventually delivered, the entry for that parcel in the Federal Express® tracking database is updated to include information about the delivery (e.g., the fact that the parcel was delivered, the time and date of delivery, the individual who signed for the parcel, etc.). In addition, at various points during the transportation of the parcel to the delivery location, information may be added to the Federal Express® tracking database regarding the delivery status of the parcel. However, Federal Express® agents manually enter this information into the Federal Express® tracking database solely on the basis of a unique Federal Express® tracking number printed on a Federal Express® Airbill used to provide addressing information to Federal Express®. Consequently, this system is useful only for tracking parcels of a single entity, namely Federal Express®. Further, even for Federal Express® parcels, the tracking capabilities of this system are quite limited. For example, the Federal Express® system does not track movement of a Federal Express® parcel either before the parcel is deposited with Federal Express® or after the parcel is delivered to its final destination.

In addition to the deficiencies in tracking capabilities exemplified by the above-described "tracking" systems, each of the various known systems for "tracking" a discrete class of items (e.g., automobiles, parcels, etc.) requires its own infrastructure, often including proprietary components and labor forces that are not, and generally cannot be, shared by other systems. As a result, each system requires a substantial investment in development time, and costs for infrastructure installation, operation, maintenance, and upgrades.

BRIEF SUMMARY

The methods and systems of the present invention may be used to track items in a way that overcomes the foregoing drawbacks of prior tracking systems and methods. For example, the present invention contemplates, among others, systems which permit separate tracking of various sets of items using the same infrastructure for tracking all such sets of items, continuous tracking of items, and actual tracking of the geographical location of items.

The present invention may be implemented as a method of tracking an item. More particularly, an item may be provided with an identifier for specifying an item-identification of the item and a tracking-station-identification of a tracking station related to the item. The item-identification of the item and the tracking-station-identification may then be obtained from the identifier of the item, via a gate having a gate-identification, and the item-identification of the item and the gate-identification of the gate may then be communicated, via a computer network, to the tracking station identified by the tracking-station-identification.

The item-identification and the tracking-station-identification may be transmitted from the identifier of the item to the gate. Alternatively, the identifier of the item may comprise a passive source for providing the item-identification and the tracking-station-identification, and the item-identification and the tracking-station-identification may be detected from the passive source.

The item-identification of the item may be uniquely associated with the item and may comprise an Internet Protocol address for the item. Likewise, the gate-identification of the gate may be uniquely associated with the gate and may comprise an Internet Protocol address for the gate, and the tracking-station identification of the tracking station may be uniquely associated with the tracking station, comprising, for example, an Internet Protocol address for the tracking station.

In one embodiment, a plurality of geographically distributed gates may be provided. Whenever an item approaches any one of the gates, the item-identification of the item and the tracking-station-identification may be obtained from the identifier of the item, via the approached gate. Preferably, the item is related to a particular one of a plurality of tracking stations, and the item-identification obtained from the item is communicated, via the approached gate, to the particular tracking station related to the item.

A plurality of items may each have a corresponding item-identification and be provided with a respective identifier for specifying the corresponding item-identification of that item. The item-identification of each item approaching a gate may be obtained, via the gate, and the obtained item-identification and a gate-identification of the gate may be communicated to a tracking station related to the item.

Also in accordance with the invention, items may be tracked by a system comprising a tracking station associated with the item, an identifier for specifying an item-identification of the item and a tracking-station-identification of the tracking station, and a gate coupled with the tracking station for obtaining the item-identification of the item and the tracking-station-identification of the tracking station and communicating the obtained item-identification and a gate-identification of the gate to the tracking station identified by the tracking-station-identification.

DETAILED DESCRIPTION

Figure 1:
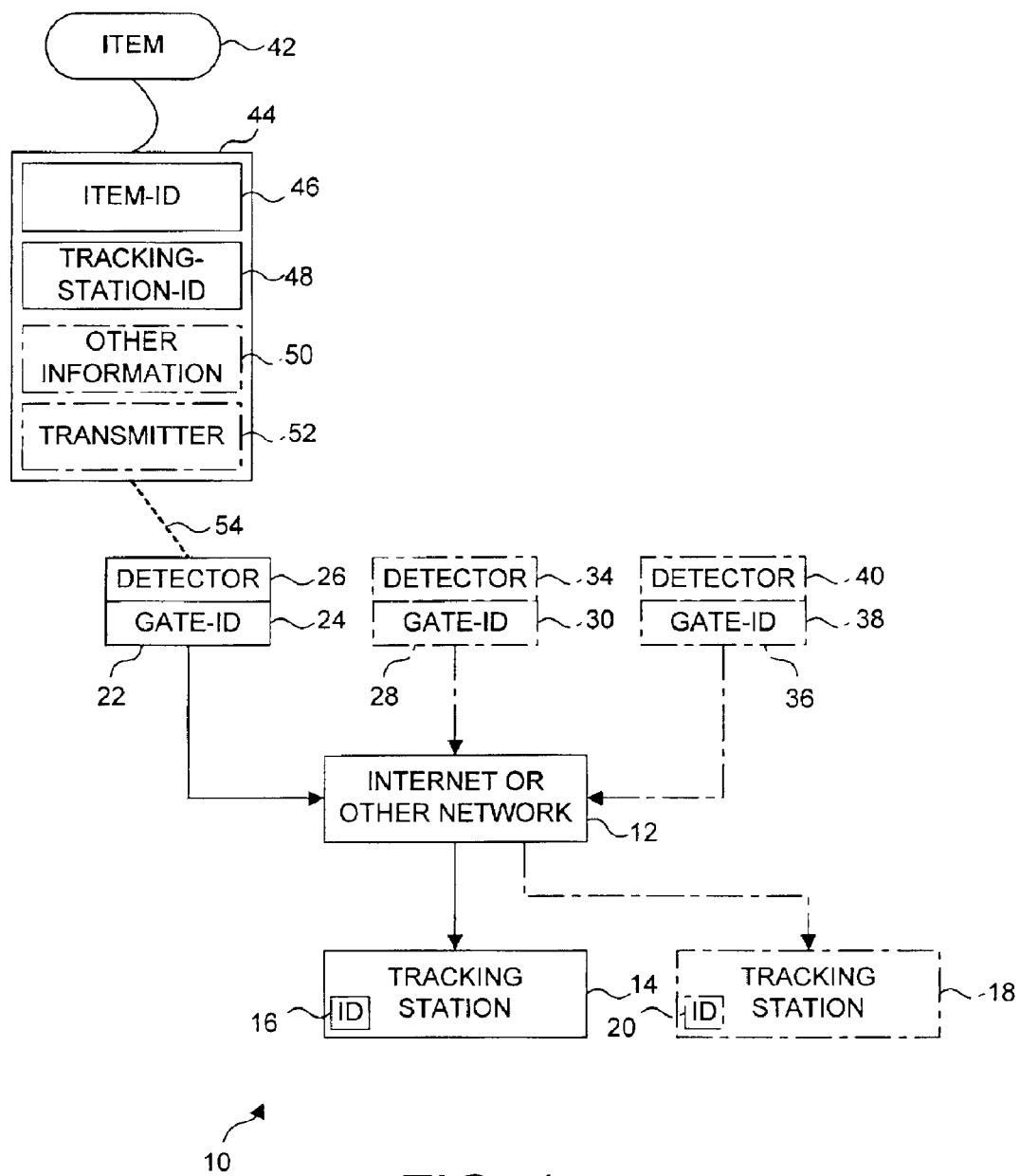
FIG. 1 is a block-diagram illustrating one exemplary embodiment of a computer-based tracking system in accordance with the present invention.

FIG. 1 illustrates, in block-diagram form, one exemplary embodiment of a system 10 for tracking items in accordance with the present invention. As shown, the tracking system 10 includes a network 12, which may include all or a part of the Internet and/or all or a part of any other suitable computer network. Regardless of the nature and breadth of the network 12, at least one tracking station 14 is coupled with the network 12. The tracking station 14 has a tracking-station-identification 16 that identifies or is otherwise associated with the tracking station 14, preferably uniquely. For example, the tracking-station-identification 16 can comprise an Internet Protocol address for the tracking station 14. Optionally, as indicated by the use of phantom lines in FIG. 1, one or more additional tracking stations, such as the tracking station 18 with tracking-station-identification 20, may also be coupled with the network 12.

The system 10 also includes at least one gate 22 having a gate-identification 24 associated therewith. The gate-identification 24 can comprise an Internet Protocol address for the gate 22 or any other identification associated, preferably uniquely, with the gate 22. In other words, in embodiments having a plurality of gates, such as gate 28 having gate-identification 30 and gate 36 having gate-identification 38 (shown in phantom lines in FIG. 1), each gate 22, 28, and 36 has a respective gate-identification 24, 30, 38 that preferably, but not necessarily, differs from the gate-identification of each other gate. Several gates located near one another could, if desired, have identical gate-identifications. However, providing each gate with a unique gate-identification may facilitate maintenance of the system 10 in that an administrator of the system 10 may be able to identify a malfunctioning gate, for example, by means of the unique gate-identification of that gate. Further, until a malfunctioning gate is repaired, another gate with a different unique gate-identification may be able to be used as a temporary substitute for the malfunctioning gate. Each gate 22, 28, 36 also includes a respective detector 26, 34, 40 as explained in more detail below.

In accordance with the present invention, the system 10 may be used to track a plurality of items of any type whatsoever (e.g., parcels, automobiles, livestock, fruit and other agricultural products, people, credit cards, personal belongings, library materials, season passes, commuter passes, etc.). For purposes of this description, one such item 42 is shown symbolically in FIG. 1. The item 42 is provided with an identifier 44 for specifying an item-identification 46 of the item 42 and a tracking-station-identification 48 of a tracking station related to the item 42. By way of illustration, the tracking station 14 may be "related to" the item 42. For example, the tracking station 14 can comprise a computer operated by or for the owner of the item 42 or any other entity or individual user interested in tracking the item 42. In such a case, the tracking-station-identification 48 of the identifier 44 of the item 42 would correspond to the tracking-station-identification 16 of the tracking station 14 related to the item 42. The item-identification 46 may comprise an Internet Protocol address for the item 42 or any other identification associated, preferably uniquely, with the item 42.

Optionally, other information 50 that may be used or even required by the system 10 may also be specified by or included in the identifier 44 in addition to the item-identification 46 and the tracking-station-identification 48, and still other information may be provided to a tracking station by a gate in addition to or instead of the other information 50. For example, such other information may be specifically related to a particular type of item being tracked by the system 10.

By way of illustration only, other information relating to a credit card may include a dollar amount of a transaction involving the credit card at a gate or a graphic image of the signature of the owner of the credit card. A graphic image of an owner's signature can also be provided for a passport being tracked by the system 10. If the system 10 is used to track people, a person's blood-type can be provided so that, for example, if the person is injured in an accident, the person's blood-type can be readily determined via the system 10 in order to expedite providing the injured person with a blood transfusion. If the system 10 employs a temporarily allocated IP address as an item-identification, such that the item-identification has a limited lifetime, the expiration date of the item-identification can be provided as optional "other" information. Similarly, if an identifier for a particular item is valid only in a particular geographical region, the identifier may provide an indication of that particular geographical region so that gates outside the geographical region that happen to detect information from the identifier of that item can disregard such information.

Further, when the item 42 approaches the gate 22, and the gate 22 detects the item-identification 46 from the identifier 44 of the item 42, the gate 22 can record a time of detection of the item-identification 46 and communicate that time of detection to the tracking station 14 via the network 12.

In one embodiment, the identifier 44 of the item 42 includes a transmitter 52 for transmitting the item-identification 46 of the item 42 and the tracking-station-identification 48 from the identifier 44 of the item 42 to the gate 22. Such a transmitter 52 may employ infrared, radio-frequency (RF), or other wireless communication, or may employ a wire-based data-transmission system, as desired. In such an embodiment, the detector 26 of the gate 22 may comprise a receiver for receiving information from the transmitter 52 of the identifier 44. Alternatively, the identifier 44 can comprise a passive source for providing the item-identification 46 of the item 42, and the item-identification 46 can be detected from the passive source (i.e., from the identifier 44) by the detector 26 of the gate 22. By way of example but not limitation, a passive source can include a bar-code or other optically or visually readable marking or label, or a proximity-sensed or other detectable source, whether the means of detection is mechanical, electrical, electronic, magnetic, electromagnetic, or electromechanical, etc. As will be evident to those of ordinary skill in the art, the particular manner in which information is obtained from the identifier 44, whether via transmitter or passive source, forms no part of the present invention, and any suitable technique can be used to obtain the information in accordance with the principles of the present invention.

The gate-identification 24 of the gate 22 may comprise an Internet Protocol address or other, preferably unique, identification of the gate 22, or may alternatively comprise a numerical value from which the geographical location of the gate may be determined, such as by the tracking station 14. Alternatively, the gate 22 may provide a tracking station 14 with information representing the geographical position of the gate 22, such that when an item 42 is detected by the gate 22, the geographical position of the item 42 at that time can be determined by the tracking station 14 that receives the item-identification 46 for the item 42 from the gate 22.

Figure 2:
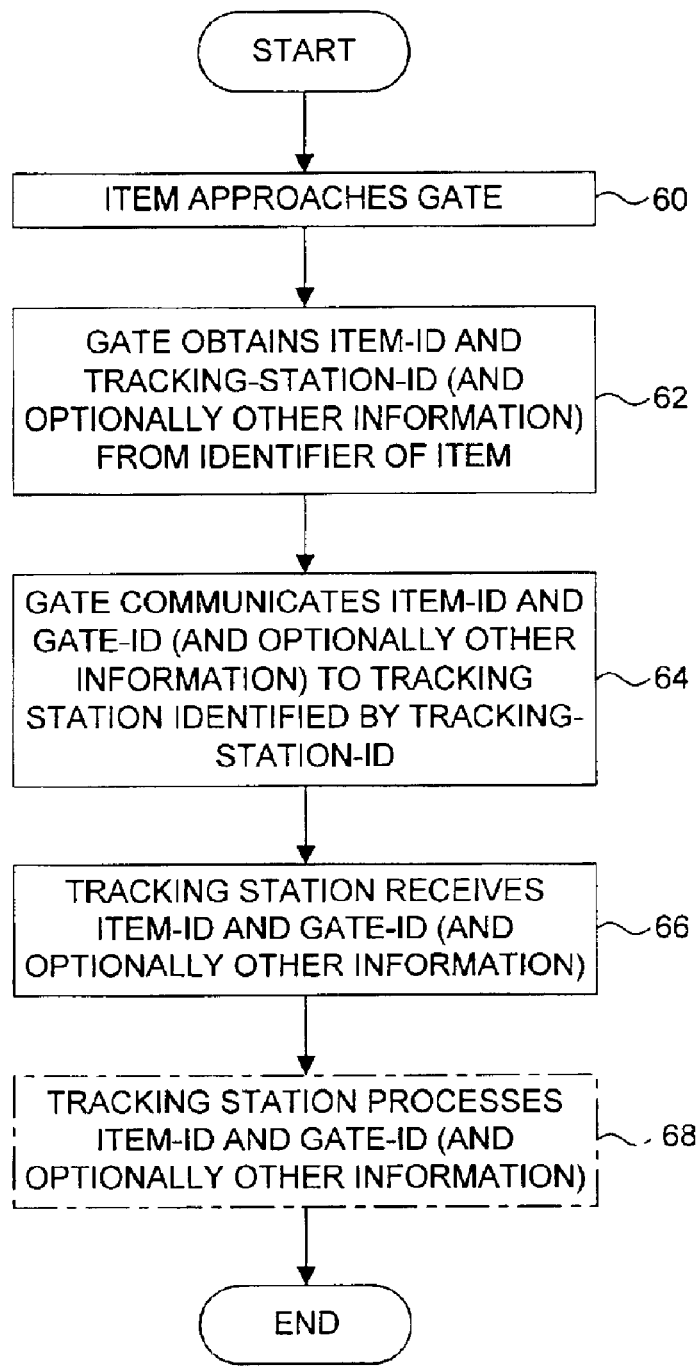
FIG. 2 is a high-level flowchart illustrating an exemplary operational sequence for tracking items in accordance with the present invention.

The flowchart of FIG. 2 illustrates one exemplary sequence of acts that may be performed in connection with a method of tracking items in accordance with the present invention. To provide a point of reference, the process illustrated by the flowchart of FIG. 2 is described in relation to the system 10 of FIG. 1. Initially, the item 42 approaches the gate 22 (block 60), and the gate 22 obtains the item-identification 46 and the tracking-station-identification 48 (and any other information 50 optionally provided) from the identifier 44 of the item 42 (block 62). The gate 22 then communicates the item-identification 46 of the item 42 and, optionally, other information (which may include, but is not limited to, some or all of the other information 50 received from the identifier 44), and the gate-identification 24 of the gate 22, to the tracking station identified by the tracking-station-identification 48 received from the identifier 44 of the item 42. By way of example, if the item 42 is related to the tracking station 14 having tracking-station-identification 16, then the tracking-station-identification 48 obtained from the identifier 44 will match the tracking-station-identification 16 of the tracking station 14. The tracking station 14 then receives the item-identification 46, the gate-identification 24 and any other information optionally provided in the identifier 44 of the item 42 or optionally provided by the gate 22 (block 66).

Optionally, as illustrated by the block 68 shown in phantom lines in FIG. 2, the tracking station 14 may then process the item-identification 46, the gate-identification 24 and any other information 50 obtained from the identifier 44 of the item 42 or other information provided by the gate 22. For example, such processing can include conveying position information for the item 42 to a user interested in tracking the item 42. As noted above, such position information can be determined, for example, based on the gate-identification 24 of the gate 22 that communicated the item-identification 46 of the item 42 to the tracking station 14. Alternatively, the gate 22 may comprise a positioning system (e.g., a global positioning system or GPS), and the position information can be obtained from the positioning system of the gate 22.

As shown in FIG. 1, the system 10 can include a plurality of geographically distributed gates 22, 28, 36, such that whenever the item 42 approaches any one of the gates, 22, 28 or 36, the item-identification 46 and a tracking-station-identification 48 may be obtained from the identifier 44 of the item 42 by that gate 22, 28, or 36 and communicated to the particular tracking station 14 related to the item 42, as specified by the tracking-station-identification 48 also obtained by the gate 22 approached by the item 42. Thus, even when the system 10 includes a plurality of tracking stations (such as tracking stations 14 and 18), the item-identification 46 and the gate-identification 24 are communicated, preferably exclusively, to the particular one (or optionally more than one) of those tracking stations 14 or 18 related to the item 42, as specified by the tracking-station-identification 48 of the identifier 44 of the item 42. As an example, an item identifier for a passport of a person with dual-citizenship may provide an identification of a tracking station in each country where that person has citizenship. Thus, when the person's passport is detected by a gate, information about that detection may be provided to each of two or more tracking stations related to the person's passport.

As will be readily appreciated by those of ordinary skill in the art, the identifier 44 can take many forms. For example, the identifier can comprise a tag affixed to the item 42, such that the various pieces of information (i.e. the item-identification 46, the tracking-station-identification 48, and any other information 50) can be obtained from the identifier 44 by a gate 22 by any suitable technique (e.g. optical scanning, magnetic-strip reading, proximity-sensing, radio or other transmission, etc.). In any case, the identifier 44 and the detector 26 of the gate 22 must employ compatible technology such that the information in the identifier 44 can be obtained by the detector 26 of the gate 22. The skilled artisan will recognize, as noted above, that the present invention is not limited to any particular manner of the information being transferred from the identifier 44 to the gate 22. Similarly, while the gate 22 communicates with the tracking station 16 via the Internet or other network 12 in the illustrated system 10 of FIG. 1, this communication may also take place by any other suitable means in addition to or instead of via the network 12 in accordance with the present invention.

The foregoing description is for the purpose of teaching those skilled in the art the best mode of carrying out the invention and is intended to be illustrative only. Numerous modifications and alternative embodiments of the invention will be apparent to those skilled in the art in view of this description, and the disclosed embodiments may be varied substantially without departing from the spirit of the invention. Accordingly, the exclusive use of all modifications within the scope of the appended claims is reserved.

What is claimed is:

1. A method of tracking an item, the method comprising:
   providing the item with an identifier for specifying an item-identification of the item and a tracking-station-identification of a tracking station related to the item;
   obtaining from the identifier of the item, via a gate having a gate-identification, the item-identification of the item and the tracking-station-identification; and
   communicating to the tracking station identified by the tracking-station-identification the item-identification of the item and the gate-identification of the gate.

2. The method of claim 1, wherein obtaining comprises transmitting the item-identification and the tracking-station-identification from the identifier of the item to the gate.

3. The method of claim 1, wherein the identifier of the item comprises a passive source for providing the item-identification and the tracking-station-identification, and wherein obtaining comprises detecting the item-identification and the tracking-station-identification from the passive source.

4. The method of claim 1, wherein the item-identification of the item is uniquely associated with the item.

5. The method of claim 1, wherein the item-identification of the item comprises an Internet Protocol address for the item.

6. The method of claim 1, wherein the gate-identification of the gate is uniquely associated with the gate.

7. The method of claim 1, wherein the gate-identification of the gate comprises an Internet Protocol address for the gate.

8. The method of claim 1, wherein the gate is coupled with the tracking station via a computing network.

9. The method of claim 1, wherein the tracking-station-identification of the tracking-station comprises an Internet Protocol address for the tracking station.

10. The method of claim 1, further comprising:
providing a plurality of geographically distributed gates; and
whenever the item approaches any one of the gates, obtaining, via that gate, the item-identification of the item and the tracking-station-identification from the identifier of the item.

11. The method of claim 10, wherein the item is related to a particular one of a plurality of tracking stations, and wherein the item-identification obtained from the item is communicated, via the approached gate, to the particular tracking station related to the item.

12. The method of claim 1, further comprising communicating to the tracking station an indication of the time of detection of the item-identification.

13. The method of claim 1, wherein the gate-identification of the gate comprises a numerical value, and wherein the tracking station can determine the geographical location of the gate based on the numerical value.

14. The method of claim 1, further comprising conveying position information for the item to a user interested in tracking the item.

15. The method of claim 14, wherein the position information is based on the gate-identification.

16. The method of claim 14, wherein the gate includes a positioning system and wherein the position information is obtained from the positioning system of the gate.

17. The method of claim 14, further comprising conveying to the user an indication of a time when the item approaches the location of the gate.

18. The method of claim 1, wherein each of a plurality of items has a corresponding item-identification and is provided with a respective identifier for specifying the corresponding item-identification of that item, and further comprising obtaining, via a gate, the item-identification of each item approaching the gate and communicating to a tracking station related to such item the obtained item-identification and a gate-identification of the gate.

19. A system for tracking an item, the system comprising:
a tracking station associated with the item;
an identifier for specifying an item-identification of the item and a tracking-station-identification of the tracking station; and
a gate coupled with the tracking station for obtaining the item-identification of the item and the tracking-station-identification of the tracking station and communicating the obtained item-identification and a gate-identification of the gate to the tracking station identified by the tracking-station-identification.

20. The system of claim 19, wherein the identifier includes a transmitter for transmitting the item-identification of the item and the tracking-station-identification to the gate.

21. The system of claim 19, wherein the identifier of the item includes a passive source for providing the item-identification of the item and the tracking-station-identification of the tracking station, and wherein the gate includes a detector for detecting the item-identification and the tracking-station-identification from the passive source.

22. The system of claim 19, wherein the item-identification of the item is uniquely associated with the item.

23. The system of claim 19, wherein the item-identification of the item comprises an Internet Protocol address for the item.

24. The system of claim 19, wherein the gate-identification of the gate is uniquely associated with the gate.

25. The system of claim 19, wherein the gate-identification of the gate comprises an Internet Protocol address for the gate.

26. The system of claim 19 wherein the gate is coupled with the tracking station via a computing network.

27. The system of claim 19, further comprising at least one additional gate and at least one additional tracking station, wherein each item is associated with a particular one of the tracking stations, and wherein each gate obtains from the identifier of any item approaching that gate the item-identification of that item and communicates said item-identification to the particular one of the tracking stations together with a gate-identification of the gate.

28. The system of claim 19, wherein the item is related to a particular one of a plurality of tracking stations, and wherein the gate communicates the item-identification obtained from the identifier of the item to the particular tracking station related to the item.

29. The system of claim 19, wherein the gate further communicates to the tracking station an indication of the time of detection of the item-identification.

30. The system of claim 19, wherein the gate-identification of the gate comprises an alphanumerical value from which the tracking station can determine the geographical location of the gate.

31. The system of claim 19, wherein the tracking station conveys position information for the item to a user interested in tracking the item.

32. The system of claim 31, wherein the tracking station conveys an indication of a time at which the item-identification is obtained by the gate.

33. The system of claim 31, wherein the position information is based on the gate-identification.

34. The system of claim 33, wherein the tracking station further conveys to the user an indication of a time when the item approaches the location of the gate.

35. The system of claim 19, wherein each of a plurality of items has a corresponding item-identification and is provided with a respective identifier for specifying the corresponding item-identification of that item, and wherein the gate obtains the item-identification of each item approaching the gate and communicates to a tracking station related to such item the obtained item-identification and a gate-identification of the gate.

36. A system for tracking a plurality of items, each having a unique item-identification and being associated with one of a plurality of tracking stations, the system comprising:
an identifier for each item for specifying an item-identification of that item and a tracking-station-identification of the tracking station associated with the item; and
a plurality of gates for obtaining the item-identification and tracking-station-identification from each approaching item and communicating the obtained item-identification and a gate-identification of the gate to the tracking station identified by the tracking-station-identification.

37. A method of tracking a plurality of items, each having a unique item-identification and being associated with one of a plurality of tracking stations, the method comprising:

providing for each item an identifier for specifying the item-identification of that item and a tracking-station-identification of the tracking station associated with that item;

providing a plurality of geographically distributed gates, each having a unique gate-identification;

obtaining, at each gate approached by one of the items, the item-identification of that item and the tracking-station-identification from the identifier of that item; and communicating each obtained item-identification and the gate-identification of the gate approached by that item to the tracking station identified by the tracking-station-identification.

38. An identifier for use in tracking an item with an item tracking system, the identifier comprising:

an item-identification uniquely associated with a particular item;

a tracking-station-identification uniquely associated with a tracking station related to the particular item; and a transmitter adapted for communicating the item-identification and the tracking-station-identification from the identifier to a gate coupled with the tracking station related to the particular item.

39. The identifier of claim 38, wherein the item-identification of the item comprises an Internet Protocol address for the item.

40. The identifier of claim 38, wherein the tracking-station-identification of the tracking station comprises an Internet Protocol address for the tracking station.

41. The identifier of claim 38, further comprising a passive source for providing the item-identification and the tracking-station-identification.

42. A gate for use in an item tracking system capable of tracking a plurality of items, each item having an identifier, the gate comprising:

a gate-identification uniquely associated with the gate;

a detector for obtaining from the identifier of one of the plurality of items an item-identification of the item and a tracking-station-identification of a tracking station related to the item; and a transmitter adapted for communicating the obtained item-identification and the gate-identification uniquely associated with the gate to the tracking station identified by the tracking-station-identification.

43. The gate of claim 42, wherein the item-identification of the item comprises an Internet Protocol address for the item.

44. The gate of claim 42, wherein the tracking-station-identification of the item comprises an Internet Protocol address for the tracking station related to the item.

45. The gate of claim 42, wherein the gate-identification uniquely associated with the gate comprises an Internet Protocol address for the gate.

\* \* \* \* \*